United States Patent [19]

Dion-Biro

[11] 4,181,469
[45] Jan. 1, 1980

[54] APPARATUS FOR ADDING EMULSIFIER TO A FLUID

[76] Inventor: Guy Dion-Biro, 46 av. du Chateau, 94300 Vincennes, France

[21] Appl. No.: 873,492

[22] Filed: Jan. 30, 1978

[30] Foreign Application Priority Data

Jan. 28, 1977 [FR] France .................. 77 02379

[51] Int. Cl.² ............................. F04B 23/14
[52] U.S. Cl. ...................... 417/87; 169/14; 239/412; 417/184
[58] Field of Search .......... 417/87, 184, 295; 169/14, 15; 239/412, 416, 417

[56] References Cited

U.S. PATENT DOCUMENTS

| | | | |
|---|---|---|---|
| 2,218,294 | 10/1940 | Muller | 169/15 X |
| 2,629,448 | 2/1953 | Duggan | 169/14 |
| 2,988,151 | 6/1961 | Dion-Biro | 169/14 |
| 3,115,158 | 12/1963 | Sheppard | 169/14 X |
| 3,607,779 | 9/1971 | King et al. | 169/14 X |

FOREIGN PATENT DOCUMENTS 2110704 10/1971 Fed. Rep. of Germany ............ 169/14

Primary Examiner—Carlton R. Croyle
Assistant Examiner—Edward Look
Attorney, Agent, or Firm—Haseltine, Lake & Waters

[57] ABSTRACT

Apparatus for adding emulsifier to a fluid comprising a conduit for flow of fluid, having a nozzle portion or restriction in the conduit, and a tube extending into the region of the restriction, to supply emulsifier into the restriction region. A valve is disposed in the conduit so as to be responsive to the flow of fluid, displacement of the valve member resulting in displacing the tube thereby to render the displacement of the tube dependent on the flow rate of the fluid through the conduit. The conicity and diameter of the nozzle are adapted to the flow rate of the fluid in the conduit.

10 Claims, 4 Drawing Figures

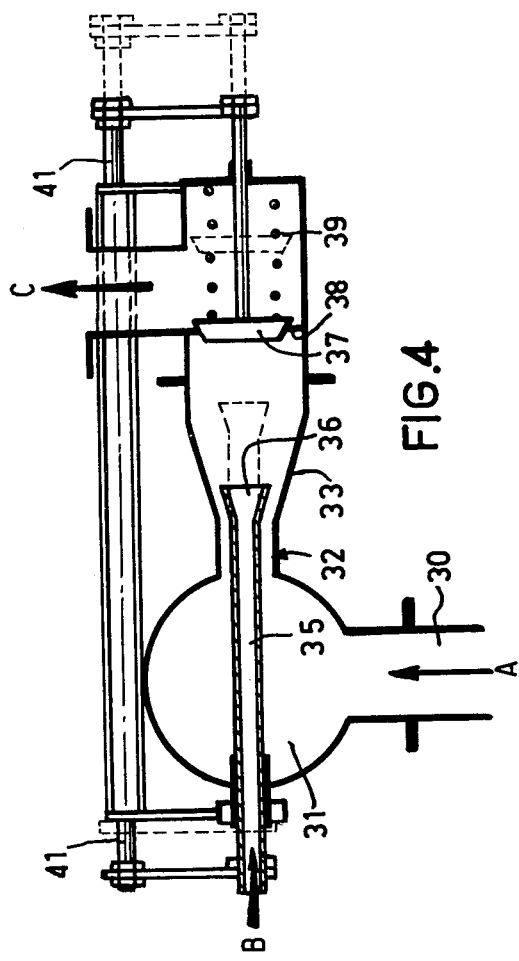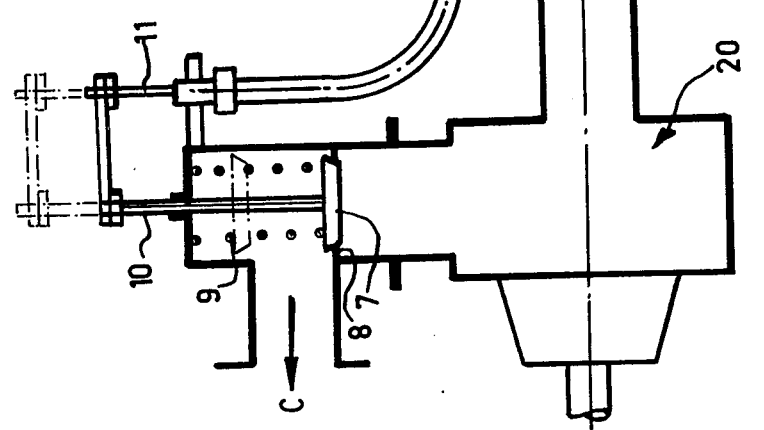

APPARATUS FOR ADDING EMULSIFIER TO A FLUID

BACKGROUND OF THE INVENTION

For fighting fire in which, for example, liquefied products are burning, use is often made of foams which are generally produced by the addition of an emulsifier to water under pressure. Various forms of apparatus for adding an emulsifier to a fluid have been proposed in the art, in particular for adding the emulsifier to water flowing in a conduit under the action of a pump. For example, the addition of emulsifier to water may be effected by means of a "Giffard" injector which utilizes or converts the energy taken from the head of flowing water, to produce a vacuum phenomenon which causes the emulsifier to be drawn into and mixed with the water, but this results in the disadvantage of a pressure drop in the flow; to compensate for this, it is necessary to use energy levels which are excessive, relative to the use thereof, hence resulting in a lack of flexibility which permits this apparatus to operate only over a very narrow operating range. In a second type of apparatus, the Giffard injector is arranged on the water pump between the inlet and the outlet, but the resulting recycling phenomenon produces a power loss which must be compensated for by the power of the pump and the drive motor; in any case, this leaves only an operating range of from 50 to 100% of the discharge of the pump, with the system not operating properly below this range, even taking account of, a pressure difference of for example, 5 bars between the pump inlet and the pump discharge. Another type of apparatus uses a metering and proportioning device which reacts to the differential dynamics of the water head and the emulsifier, the emulsifer being carried from an emulsifier storage tank to the metering and proportioning device by means of a pump.

In this apparatus, the metering and proportioning device is a static system which has two sets of valves which are open and closed in the rest position and which become blocked in those positions if the emulsifier solidifies in the device. In addition, the emulsifier must be injected into the proportioning device at a pressure which is higher than the water head for example, by two bars. This assembly is also delicate and requires motors, which is a disadvantage because such motors will not always operate simultaneously.

In the three kinds of apparatus mentioned above, a common feature is the lack of operating flexibility, namely, that it is not possible, under the best conditions, with very good apparatus and optimum adjustments, to be able to use them in a functional range outside the limits of from 50 to 100%.

SUMMARY OF THE INVENTION

An object of the present invention is to overcome the above disadvantages and to increase the operating flexibility of the apparatus, making it possible to use the full performance of a pump, from 0 to 100%. Another object is to provide for the addition of an emulsifier, with a minimum preset relative value, over a range of adjustment.

In apparatus according to the invention, a nozzle is disposed at the inlet or intake side of the pump, the conicity and diameter of the nozzle being adapted to the performance characteristics of the pump; a central tube is disposed within the nozzle and is displaceable axially therein and whose diameter is dependent on the one hand, on the maximum required flow rate of the emulsifier and, on the other hand, on the maximum flow rate or output of the pump. When the pump is not in operation, the tube is completely inserted into the nozzle whereas when the pump is at maximum output, the tube is disposed totally outside of the nozzle. Thus, the position of the tube will depend on the output flow rate required from the pump and the relative value of the amount of emulsifier to be added to the fluid flow.

The translatory movement of the tube may be controlled by a valve disposed at the outlet or discharge side of the pump. This valve is normally held closed on its seat when the pump is in a rest condition, and opens in dependence on the output flow rate of the pump; by way of a connecting assembly, this valve displacement controls the displacement of the tube relative to the nozzle. The tube-valve connecting assembly may be of any suitable construction, and adjustment of the relative value of the amount of emulsifier added is achieved by acting on the above-mentioned connecting assembly.

BRIEF DESCRIPTION OF THE DRAWINGS

FIG. 3 is a diagrammatic view of a second embodiment of the apparatus, on a pump, and FIG. 4 is a view of the apparatus mounted on a conduit.

DESCRIPTION OF PREFERRED EMBODIMENTS

Figure 1:
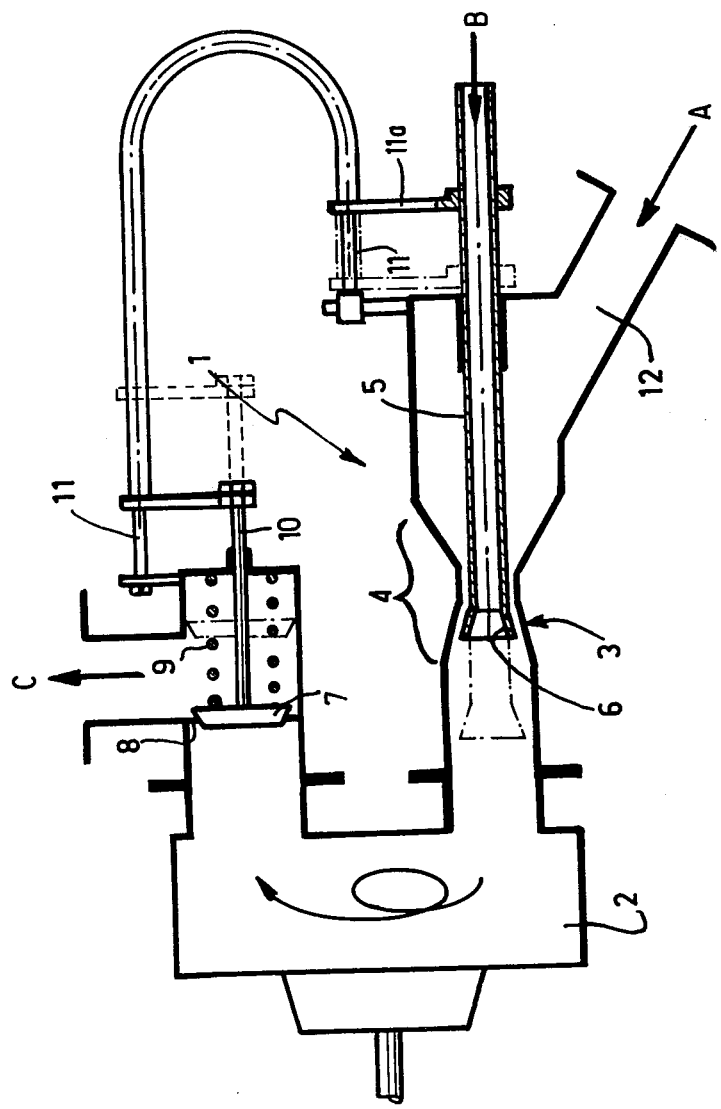
FIG. 1 is a diagrammatic view of a first embodiment of the apparatus, on a pump.

Reference is made to FIG. 1 which shows the apparatus 1, according to the invention, disposed at the inlet or suction side of a pump 2 having an axial inlet and outlet. The apparatus 1 includes a nozzle or restriction portion 3 in the flow conduit, the nozzle comprising a convergent-divergent portion 4, the conicity and diameter of which are adapted to the performance characteristics of the fluid flow and thus of the pump 2, providing a venturi effect. Disposed within the nozzle 3 is a central round tube 5 having a divergent end portion 6 which is co-operable with the divergent portion of the nozzle 3. The diameter of the tube is dependent on the maximum flow rate of emulsifier to be added to the flow of fluid through the nozzle 3 and the maximum output flow rate of the pump 2. The tube 5 is mounted so as to be displaceable axially within the nozzle 3.

Disposed at the outlet or discharge side of the pump 2 is an output flow-responsive control valve 7 which is urged to a closed position against its seat 8 by a spring 9. A rod 10 of the valve 7 is displaceable to control displacement of the tube 5 within the nozzle 3, by means of a connecting assembly 11. This assembly comprises an inner cable fixed at respective ends to the casing of valve 7 and to a casing portion adjacent the nozzle 3, and an outer cable cover connected to the rod 10 and to a bracket 11a secured on the tube 5, the outer cable cover being displaceable on the inner cable, as shown.

In the embodiment illustrated, fluid such as water is passed in the direction of arrow A into the nozzle 3 by a conduit 12, and the emulsifier is introduced through the tube 5 in the direction of arrow B.

When the pump 2 is operating, water flowing in the conduit 12 is discharged by the pump 2 and acts against the valve 7 which is thereby lifted away from its seat 8 so that the mixture of fluid and emulsifier is discharged in the direction of arrow C. The movement of the valve 7, transmitted by its rod 10 and the cable assembly 11, acts on the tube 5 for delivering the emulsifier, whereby the tube 5 is axially displaced within the nozzle 3 relative to the divergent portion at 4. The open position of the valve 7 and the corresponding position of the tube 5 is shown in chain-dotted lines in FIG. 1. The extent of axial displacement of the tube 5 is proportional to the output of the pump 2. It should be noted that such displacement of the tube 5 is assisted by the fact that, when an increased pump output is required, the pump 2 will increase its suction effect and will thus promote the axial displacement of the tube 5, thus making it possible to achieve quicker and virtually instantaneous reaction of the apparatus to the change in operating condition.

Pre-adjustment of the emulsifier flow rate through the tube 5 is effected by acting on the connecting assembly, that is to say, by adjusting the length of the cable assembly 11. For a given output of the pump, such adjustment varies the position of the divergent end portion 6 of the tube 5 relative to the portion 4 of the nozzle 3. For a given output of the pump 2, the peripheral speed of the water flowing around the divergent end portion 6 of the tube 5 increases, as the flow section between the divergent end portion 6 and the portion 4 of the nozzle 3 becomes smaller. In consequence, for a given pump output, if the portion 6 is retracted to the bottom of the cone of the portion 4, a larger amount of emulsifier will be injected, whereas if the tube 5 with portion 6 is pushed in the other direction, less emulsifier will be injected into the water flow.

Figure 2:
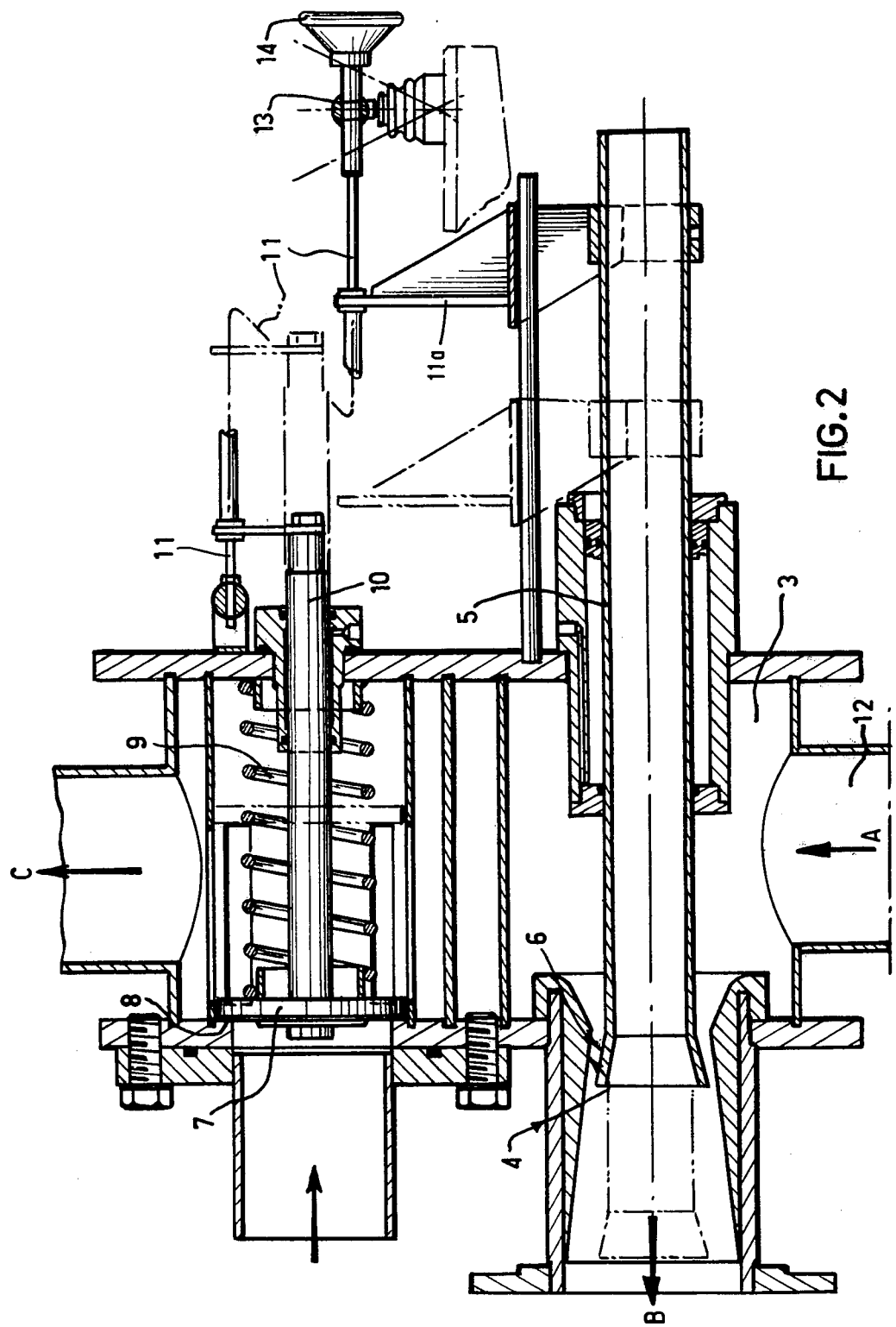
FIG. 2 is a sectional view in detail view of the apparatus of FIG. 1.

FIG. 2 is a detail view in section of the apparatus diagrammatically shown in FIG. 1. FIG. 2 does not show the pump, but it shows the main components of the apparatus, namely the tube 5 for delivering the emulsifier which opens at its divergent portion 6 within the convergent-divergent portion 4, the valve 7 for controlling the tube, which valve is held on its seat 8 by the coil spring 9, and the connecting cable assembly 11 which is fixed by bracket 11a to the tube 5. The open position of valve 7 and the corresponding position of the tube 5 and bracket 11a are shown in FIG. 2 in chain-dotted lines. FIG. 2 also shows a device 13 for pre-adjusting the basic flow rate of emulsifier, comprising a handwheel 14 for acting on and thus varying the length of the cable 11. It will be understood that this wheel device 13 may be replaced by other suitable means, for example by a hydraulic control arrangement.

FIG. 3 diagrammatically shows another embodiment of the apparatus according to the invention, which is generally the same as that shown in FIG. 1 except that the valve 7 is mounted at the periphery of a rotary flow pump 20.

FIG. 4 is a diagrammatic view of another embodiment of the apparatus according to the invention, mounted on a conduit 30. In this embodiment, the water flows through conduit 30 and into a chamber 31 comprising having an outlet conduit 32 forming a downstream-divergent portion 33. Conical end portion 36 of an axial tube 35 is displaceable within the divergent portion 33. The tube 33 is controlled in its axial movement by the valve 37 which is disposed at the outlet end of the conduit 32 and which is held closed on its seat 38 by a spring 39; the valve 37 is thus disposed at the outlet or downstream of the divergent portion 33. In the FIG. 4 embodiment, the valve 37 controls displacement of the tube 35 by means of a sliding rod 41. In this embodiment also, when the water flow rate through the conduit 31 is increased, the effect of this is to produce axial movement of the tube 35 which is subjected to a differential pressure, and this makes it possible to have a substantially zero response inertia.

What is claimed is:

1. Apparatus for adding emulsifier to a flowing fluid, comprising a conduit for carrying said fluid, a nozzle restriction portion in the conduit, a tube extending within the conduit and having a discharge end portion disposed in the conduit in the region of the nozzle portion, the conicity and diameter of the nozzle portion being adapted to the flow performance in the conduit, a valve assembly arranged to be responsive to the flow of fluid in the conduit, and means operatively connecting the valve assembly to the tube for displacement of the tube relative to the nozzle portion in dependence on the fluid flow in the conduit.

2. Apparatus according to claim 1 wherein said nozzle portion comprises a downstream-divergent wall portion.

3. Apparatus according to claim 2 wherein the discharge end of said tube comprises a downstream-divergent end portion co-operable with the divergent portion of the nozzle portion.

4. Apparatus for adding emulsifier to a flowing fluid, comprising a first conduit portion, means for connecting the first conduit portion to the intake of a pump, means for introducing fluid into the first conduit portion for flow therethrough to the pump, a nozzle portion in the first conduit portion, a tube extending in the first conduit portion and having a discharge end opening in the region of the nozzle portion for introducing emulsifier into the first conduit portion, the tube being mounted for axial displacement in the conduit portion relative to the nozzle portion, a second conduit portion, means for connecting the second conduit portion to the outlet of the pump for receiving the fluid flow therefrom, a valve member disposed in the second conduit portion and responsive to the fluid flow therein, and means operatively connecting the valve member to the tube whereby displacement of the valve member by the fluid flow pressure thereon produces displacement of the tube in the first conduit portion, thereby to adjust the flow of emulsifier through the tube and into the first conduit portion.

5. Apparatus according to claim 4 wherein said axial displacement of the tube is dependent on the flow rate of fluid required from the pump and the relative value of the amount of emulsifier to be added to the fluid flow.

6. Apparatus according to claim 4 wherein said nozzle portion comprises a downstream-divergent wall portion.

7. Apparatus according to claim 4 wherein said nozzle portion comprises an upstream-convergent wall portion and a downstream-divergent wall portion downstream of the convergent wall portion.

8. Apparatus according to claim 6 wherein the discharge end of said tube comprises a downstream-divergent end portion co-operable with the divergent portion of the nozzle portion.

9. Apparatus according to claim 7 wherein the discharge end of said tube comprises a downstream-divergent end portion co-operable with the divergent portion of the nozzle portion.

10. Apparatus according to claim 4 including means for adjusting said connecting means, thereby to modify the operating relationship between said valve and said tube displacement.

* * * * *